(12) United States Patent
Kombowski

(10) Patent No.: US 8,172,536 B2
(45) Date of Patent: May 8, 2012

(54) IMPELLER GUIDE WHEEL FOR A HYDRODYNAMIC SPEED VARIATOR/TORQUE CONVERTER AND METHOD FOR MANUFACTURING AN IMPELLER

(75) Inventor: Eugen Kombowski, Buehl (DE)

(73) Assignee: Schaeffler Technologies AG & Co. KG, Herzogenaurach (DE)

(*) Notice: Subject to any disclaimer, the term of this patent is extended or adjusted under 35 U.S.C. 154(b) by 741 days.

(21) Appl. No.: 12/316,055

(22) Filed: Dec. 9, 2008

(65) Prior Publication Data
US 2009/0155077 A1    Jun. 18, 2009

(30) Foreign Application Priority Data
Dec. 13, 2007    (DE) .................. 10 2007 060 121

(51) Int. Cl.
*F01D 5/22*    (2006.01)

(52) U.S. Cl. .............. 416/192; 416/186 R; 416/188; 416/229 R; 415/189; 415/206

(58) Field of Classification Search .......... 415/189, 415/206; 416/144, 192, 188–190, 186 R, 416/229 R; 29/889.3, 889.4
See application file for complete search history.

(56) References Cited

U.S. PATENT DOCUMENTS

| | | | | |
|---|---|---|---|---|
| 2,779,424 A * | 1/1957 | Lyon | ............. | 416/192 |
| 3,189,982 A * | 6/1965 | Merz | ............. | 29/889.3 |
| 7,384,241 B2 * | 6/2008 | Watanabe et al. | ........... | 416/192 |
| 2008/0044292 A1 * | 2/2008 | Spaggiari | ............. | 416/243 |

FOREIGN PATENT DOCUMENTS
WO  WO 2007/110019 A1  10/2007
WO  WO 2007/110025 A2  10/2007

\* cited by examiner

*Primary Examiner* — Dung A. Le
(74) *Attorney, Agent, or Firm* — Simpson & Simpson, PLLC

(57) ABSTRACT

An impeller, for example, a guide wheel for a hydrodynamic speed variator/torque converter, including a plurality of blades. Each blade has a blade base and a blade tip area. Stiffening means are situated in at least one of the blades in at least the blade base area and/or the blade tip area.

20 Claims, 3 Drawing Sheets

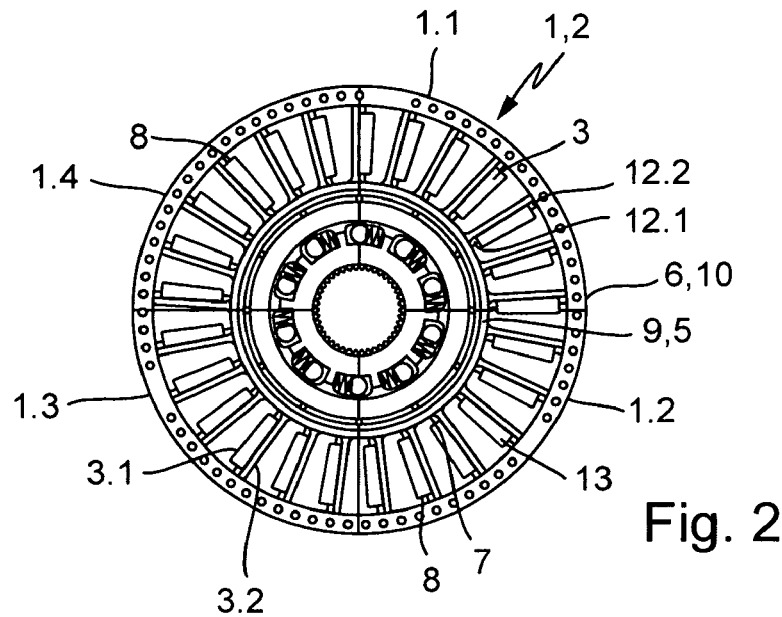
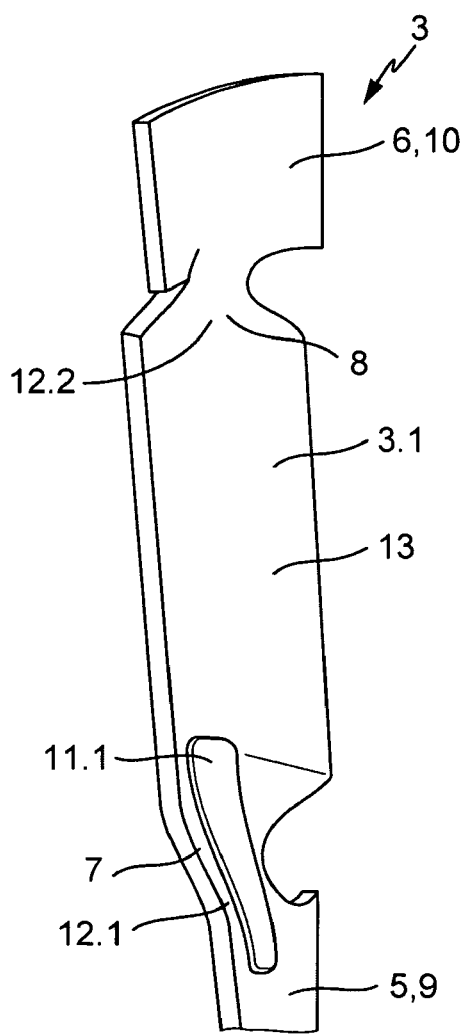
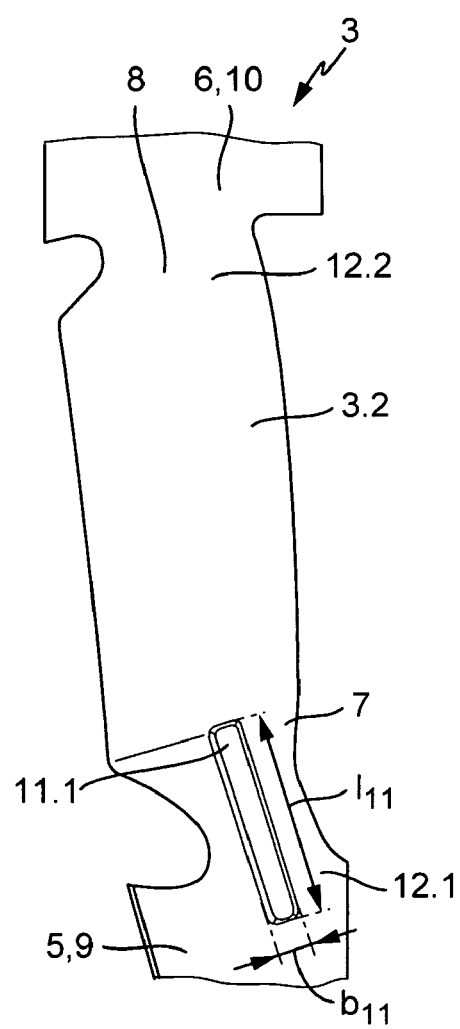
Fig. 2
Fig. 3a
Fig. 3b

IMPELLER GUIDE WHEEL FOR A HYDRODYNAMIC SPEED VARIATOR/TORQUE CONVERTER AND METHOD FOR MANUFACTURING AN IMPELLER

CROSS-REFERENCE TO RELATED APPLICATIONS

This application claims priority from German Patent Application No. 10 2007 060 121.4, filed on Dec. 13, 2007, which application is incorporated herein by reference.

FIELD OF THE INVENTION

The invention relates to an impeller, for example, a guide wheel for a hydrodynamic speed variator/torque converter, including a plurality of blades shaped in the circumferential direction, the individual blade including a blade base and a blade tip. The invention also relates to a method for manufacturing such an impeller, for example, a guide wheel for a hydrodynamic speed variator/torque converter.

BACKGROUND OF THE INVENTION

Impellers in the form of guide wheels for use in hydrodynamic speed variators/torque converters are known in a large number of versions from the existing art. These function as a reaction element, and serve to influence the transmissible torque while at the same time influencing the speed of rotation. Impellers of this sort are manufactured in various ways. They can be constructed of a plurality of components joined together in a rotationally fixed connection. The individual blades can be fixed in the outer and inner rings by positive locking, friction locking or material connection. Designs are previously known from the published patents WO 2007/110025 and WO 2007/110019 in which parts of the impellers, including an inner ring and an outer ring, as well as blades situated between them oriented in the circumferential direction, are executed as a single-piece component. These ranges of parts can be designed in this case as segments, or also as a complete blade rim ring. Published patent WO 2007/110025 reveals an impeller or guide wheel for a hydrodynamic torque converter, which has a large number of blades. In this case, the guide wheel has a plurality of components manufactured separately from each other and each including one or more of the blades of the guide wheel, which components are firmly connected to each other. These components are situated relative to each other in such a way that the blades of various of these components are situated at an offset to each other in the circumferential direction extending around a central axis of the guide wheel, forming intermediate spaces that exist in this circumferential direction. Each of the blades is made from a single piece, between its respective entry edge and its respective exit edge, so that each of the blades is made, for example, from exactly one of the components that have one or more blades of the guide wheel. At the same time, individual blades can be assigned to such various components. In one embodiment, a guide wheel includes a plurality of components manufactured separately from each other and each having one or more of the blades of the guide wheel, which are firmly connected to each other and have an inner ring and an outer ring, whereby the axial spacing of two outer rings varies from the axial spacing of the inner rings assigned to these two outer rings to form a spread, in particular a spread that increases the axial rigidity.

An analogous design is previously known from WO 2007/110019.

The blades of impellers, in particular guide wheels or stator blade wheels, are subjected to very high axial forces and forces in the circumferential direction, for which allowance must be made by the blade geometry and the design of the connections between the joints and the elements that carry the blades, which results in high demands on the manufacturing. Even with a one-piece design there may not necessarily be adequate rigidity in the axial and encircling directions for high torques.

BRIEF SUMMARY OF THE INVENTION

The object of the invention is therefore to refine the design of an impeller, for example, a guide wheel, for use in a hydrodynamic speed variator/torque converter or a stator blade wheel of a hydrodynamic retarder, in such a way that the disadvantages of the existing art are avoided, in particular so that the invention impeller exhibits high rigidity in both the axial and the encircling directions and so that design and fabrication costs are lowered.

The impeller, for example, a guide wheel for a hydrodynamic speed variator/torque converter, includes a plurality of blades oriented in the circumferential direction, which describe a blade base and a blade tip in the radial direction. According to the invention, stiffening means are provided on at least one of the blades in the area of the blade base and/or in the area of the blade tip.

The solution according to the invention thereby makes it possible to increase the rigidity in both the axial and the circumferential directions at the especially critical locations, using simple means.

Encircling direction means the direction in the circumferential direction around an axis that corresponds to the reference axis. The axial direction corresponds to the direction parallel to the reference axis.

In one embodiment, the guide wheel is constructed of at least one inner ring made in at least one piece or in multiple pieces from segments, an outer ring made in one piece or in multiple pieces from segments, and the blades situated between them, the blades being coupled with the particular component that forms the inner ring or inner ring segment and/or the component that forms the outer ring or the outer ring segment in such a way that the blades are made in a single piece with the latter. At the same time the blades are unscrewed from a plane can be described by an inner and an outer ring or are tilted relative to the latter. The blade tip and/or blade base is at least partially formed in this case by the connecting area.

The stiffening means provided according to the invention are, in one embodiment, provided in the connecting area. The stiffening means, in one embodiment, include at least one bead. The concrete form of the bead with regard to its geometric shape, cross section, dimensioning, length, width, depth and extension or alignment direction, is a function here of the loads that occur, in particular of the forces that occur in the circumferential direction and the axial direction.

In one embodiment, the beads extend not only within the connecting area, but also—depending on the arrangement—on the outer and/or inner ring; that is, from the area of the blade tip or blade base into the respective inner ring or outer ring. In another embodiment, the bead extends into the area of the blade surface. However, it extends into the area of the theoretically effective blade surface only far enough so that no impairment of the flow results.

The beads are, in one embodiment, incorporated in such a way that the indentations are formed on the back of the blade and the projections on the front of the blade. The areas of reinforcement are thus provided essentially in the area of the greater load, namely the inflow side.

In one embodiment, each of the blades is executed as a formed sheet metal part, to minimize cost and complexity associated with manufacturing the guide wheel and fashioning the beads.

There are a great many possibilities in regard to the concrete design of the geometric form of the blades. In one embodiment, the form includes a constant thickness, with the blades having a polygonal, for example, a rectangular form.

In another embodiment, one bead is provided; also conceivable however, in view of greater blade widths, are a plurality of beads situated side-by-side and parallel. The individual bead extends here essentially in the direction of the blade; that is, with blade surfaces tilted out of the plane of the ring in this direction in the end state of the guide wheel.

The method according to the invention for manufacturing such an impeller, for example, a guide wheel or stator blade wheel, includes a first process step in which a sheet metal element, for example, a sheet metal plate, is made available. From the latter a basic contour of the blades is produced, and, in one embodiment, at least one or both of the elements that form the inner and/or outer ring. This is accomplished in one processing step of the sheet or sheet metal plate, by cutting parts from the latter. The sheet or sheet metal plate is then provided with the bead in the appropriate blade already before or during the cutout process or after the cutout process. Next, the sheet or sheet metal plate spanning a plane is reshaped by forming to make a component of the guide wheel having at least one, and in one embodiment, a plurality of blades.

In one embodiment, the areas forming blades are tilted or twisted out of the plane of the ring.

According to the invention, the incorporation of the stiffening means thus takes place before the actual reshaping process, so that this must also be taken into account when designing the bead, since the latter will then also be turned in the particular direction with the turning of the blade, and can undergo another shaping in the process.

An impeller designed according to the invention is, for example, usable as a guide wheel with a hydrodynamic speed variator/torque converter. In another embodiment, a present invention impeller design is used with a stator element, for example in a hydrodynamic brake.

BRIEF DESCRIPTION OF THE SEVERAL VIEWS OF THE DRAWING

The solution according to the invention will be explained below on the basis of figures. They depict the following details:

FIG. 2 is a front view of an invention impeller;

FIG. 3a is a front view of an impeller blade according to the invention with stiffening means situated at least in the blade base;

FIG. 3b is a back view of an impeller blade shown in FIG. 3a;

DETAILED DESCRIPTION OF THE INVENTION

Figure 1A:
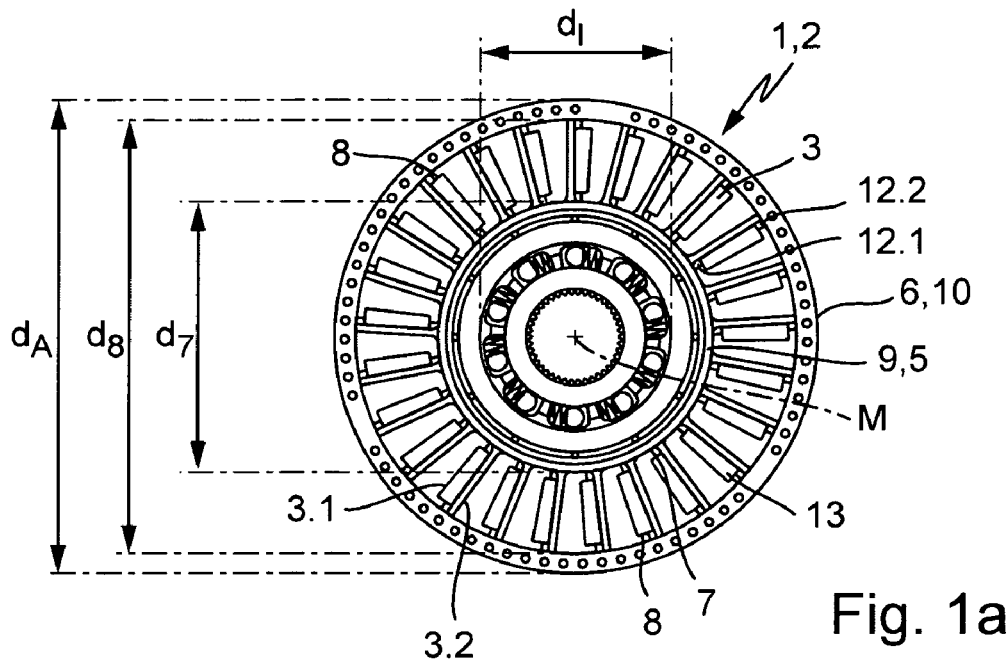
FIG. 1a is a front view of an invention impeller.
Figure 1B:
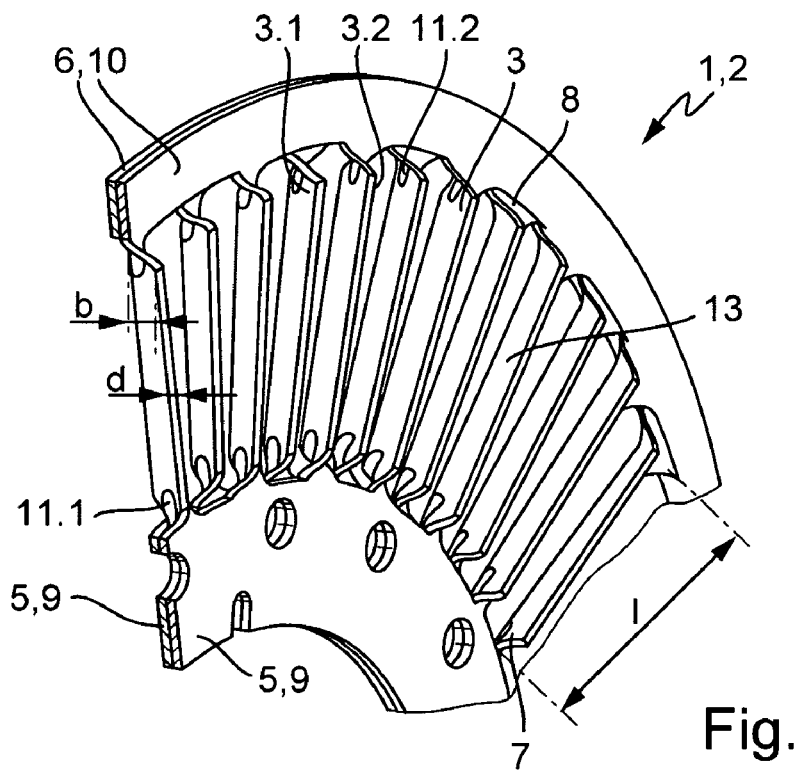
FIG. 1b is a partial perspective view of the impeller shown in FIG. 1a;l

FIGS. 1a and 1b illustrate in a simplified schematic depiction an example of the construction of impeller 1 designed according to the invention, which finds use, for example, in the form of guide wheel 2 in hydrodynamic speed variators/torque converters. Guide wheel 2 has the function of a reaction element in this case. Its layout and design are definitive for the possible speed variation/torque conversion in speed variators/torque converters of this sort. FIG. 1a illustrates a view seen from the right in the installed position in a hydrodynamic speed variator/torque converter, while FIG. 1b reproduces a detail from a perspective view.

The explanatory terms employed, "axial," "radial" and "in the circumferential direction," refer to the theoretical reference axis M, which normally coincides with the axis of rotation (not shown) of the hydrodynamic speed variator/torque converter in which the guide wheel is utilized. The term "axial" additionally refers here to an orientation parallel to the reference axis M, the adjective "radial" to a radius referenced to the reference axis, and the circumferential direction corresponds to the circumferential direction around the reference axis M of guide wheel 2. Individual blades 3 in this case are arranged at a distance from each other in the circumferential direction, forming intermediate spaces 4, with the individual blades being characterized by a front side 3.1 and a back side 3.2 in each case. Front side 3.1 here means the inflow side, i.e., the side which the flow strikes, viewed in the direction of flow, and in a corresponding manner undergoes a deflection or an influencing or modification of the course of flow to vary the speed of rotation and convert the torque. Blade back side 3.2 corresponds to the opposite side of the individual blade in the circumferential direction, in particular the side oriented opposite of the front side 3.1. The individual blade 3 may be design here with the same thickness d or a different thickness over its width b, which is measured over the extension in the axial direction or the course of the blade, i.e., perpendicular to the blade length l. This also applies to the shape over the blade length l, i.e., in the installed position of the extension in the radial direction. The thickness d corresponds here to the blade thickness in the circumferential direction of impeller 1. The individual blade 3 includes an extension l in the radial direction, including blade base 7 and blade tip 8 where it ties to components 5 and 6 which hold the blades. Blade base 7 is described here by an area that lies in the range of the inner diameter $d_7$ of the individual blade 3 in the installed state, and in which the linkage to an inner component 5 occurs. Blade tip 8 here describes the area which is characterized by the radially outer diameter $d_8$ of the individual blade 3, and is situated as it were in the area of linkage to the radially outer component 6. Depending on the design, individual blades 3 may be executed together with radially inner and/or radially outer component 5, 6, either as a structural unit, i.e., in a single piece, in one embodiment, or inserted into these components in an appropriate manner and joined with them in a rotationally fixed connection. Components 5 and 6 are executed in this case as annular segments, preferably as annular elements. These describe the absolute inner diameter $d_I$ and the outer diameter $d_A$ of impeller 1, in particular of guide wheel 2, which differ from the diameter $d_7$ or $d_8$ by the amount of the extension of these components in the radial direction.

Components 5, 6 may be designed in annular form or in the form of ring segments, as depicted in FIG. 1b, individual ring segments 1.1, 1.2, 1.3, 1.4 being combinable into one annular component. Individual components 5 or 6 here form at least one segment of inner ring 9 or the entire inner ring 9, and one segment of an outer ring 10 or an entire outer ring 10. In another embodiment, individual blade 3 forms a structural unit with at least one of the components 5, 6, for example, inner ring 9 or outer ring 10, or in one embodiment, both components 5 and 6, here inner ring 9 and outer ring 10, meaning that blade 3 is executed as a single piece with the latter elements.

According to the invention, to increase the rigidity in the axial and encircling directions of blades 3, the blades are equipped with beads 11 in the area of blade base 7 and/or blade tip 8. The beads are identified by way of example both in the blade base 7 in the form of beads 11.1 and in the area of the blade tip 8 in the form of beads 11.2. These are machine-produced, channel-shaped indentations which serve to increase the rigidity. The beads 11.1, 11.2 are shaped to match the load, in particular in the axial direction and the circumferential direction. The beads 11.1, 11.2 are swaged on the back side 3.2 of the blade, and produce a projection on the front side 3.1. The form and contour largely conforms to the shape of the blade. The individual blades 3 are not necessarily characterized by a position parallel to a line perpendicular to the axis of rotation R, but rather the blade geometry normally describes curved blade surfaces that may also differ between different guide wheels in terms of their concrete design, in order to be matched to corresponding designs and demands. Depending on the blade geometry, the contours of the beads 11.1, 11.2 substantially follow the contours of the blade surface on the front or back side 3.1, 3.2 in the radial direction, so that the individual beads 11.1 or 11.2 each extend in the connecting areas 12.1, 12.2 of the blades 3 with inner ring 9 and outer ring 10. The beads 11.1, 11.2 are situated in the connecting area in this case, or can also extend part way into inner ring 9 or outer ring 10 and/or blade 3, in particular the effective blade surface of the latter.

FIGS. 1a and 1b illustrate an embodiment in which inner ring 9 and outer ring 10 are constructed in one piece with the blades 3. Since the blades 3 of guide wheel 2 are inclined with respect to the plane of inner and outer rings 9, 10, in a one-piece design this is executed by forming the connecting areas 12.1 and 12.2 in the vicinity of the blade base 7 and the blade tip 8 with inner ring 9 and outer ring 10 as a free-form area. These free-form areas allow re-shaping, and hence bringing the blade 3 from the position in the same plane with inner ring 9 and outer ring 10 to a tilted position relative to that plane.

FIGS. 1a and 1b illustrate an embodiment with one-piece execution of blade 3, inner ring 9 and outer ring 10. Here the impeller is made up of two one-piece components of this sort, the latter being situated in the axial direction at an offset to each other in the circumferential direction, so that the blades formed on the individual construction elements each mesh with each other as it were, forming the blade ring in the circumferential direction. Furthermore, the individual impeller 1 can also be made up in the circumferential direction of a plurality of individual sub-segments 1.1 through 1.n, with each of the sub-segments containing at least one blade.

A design of this sort is depicted by way of example in FIG. 2. Here impeller 1 is subdivided in the circumferential direction into a plurality of individual segments 1.1 through 1.4.

The individual bead 11, in particular beads 11.1 and 11.2, are designed depending on the load and on the shape of the blade geometry. According to one embodiment, bead 11.1 or 11.2 extends at least within the connecting areas 12.1 and 12.2 of blade 3 designed as free-form areas, and on inner ring/outer ring 9, 10. It is also conceivable according to FIGS. 3a and 3b to shape bead 11.1 or 11.2 in such a way that it extends in the radial direction as far as the blade area, and thus the effective blade surface 13, and furthermore into the area of inner ring 9 or into the area of outer ring 10. FIGS. 3a and 3b illustrate, on the basis of two views of the front and back sides 3.1 and 3.2 of a blade 3, the position and shape of a bead 11.1 in the formed state on the basis of a detail from a guide wheel 2. Here too, the connecting areas 12.1 and 12.2 are recognizable. The cross sectional geometry, in particular the bead depth, which is measured by way of the blade thickness d, the length $l_{11}$, which is ascertained in the radial direction, and the width $b_{11}$, which is ascertained in the width direction b of the blade 3, is a function here of the necessary strength and stiffness that must be achieved in the respective area of the occurring loads. This can also extend into the area of inner and outer rings 9, 10 of blade 3, as described earlier; however, here extension is only desired insofar as the flow is not influenced.

Figure 4:
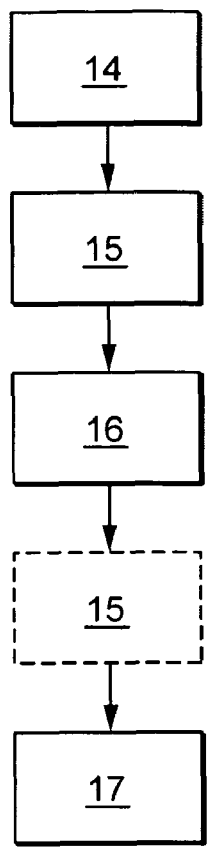
FIG. 4 is a flow chart for an invention method.

FIG. 4 illustrates a method for producing such an impeller 1, in a simplified schematic depiction based on a signal flow chart. In a first step 14 at least one sheet or sheet metal plate is prepared. In a subsequent further step 16, this sheet or sheet metal plate is worked on by separating, such as for example cutting, laser cutting, water jet cutting, sawing or the like, and the basic contour before the shaping of guide wheel 2 or of the corresponding guide wheel segment is separated out. The sheet or sheet metal plate may for example be formed into a round plate, with sections being produced that will make blades 3, or that will make blades 3 in the finished guide wheel. In particular, peripheral contours or sections of the peripheral contours of the individual blades 3 can be produced here by separating. Furthermore, according to the design in FIG. 1 provision can be made for these that the guide wheel 2 being manufactured has an inner ring 9 and an outer ring 10, and that in connection with the separating in this step 16 a section is produced that is to form outer ring 10, and/or a section is produced that later is to form inner ring 9, and/or sections are produced that will afterward form the blades 3. At the same time provision can be made that, as necessary to produce a guide wheel according to FIG. 1, the separating is done in such a way that after the separating the blades 3 or the sections that are to form the blades remain connected in a single piece with the section that later is to form inner ring 9 and/or the section that later is to form outer ring 10. This means that the basic contour of inner ring 9, outer ring 10 and blade 3 is produced already in step 16 by a separating process. The separating processes can be coordinated with each other individually. In terms of detail, the separating processes can be undertaken simultaneously for a guide wheel segment, or one after another. The semi-finished stock 18 produced in step 16 by separation, which forms the basic component for a guide wheel segment or for the entire guide wheel, can essentially be described by a plane. To align the blades 3, in a subsequent procedural step 17, to make a component of the guide wheel having at least one blade, the latter is worked on by forming. The forming can be done by bending or deep drawing. Provision is made during the forming process so that one or more blades of the guide wheel being manufactured are shifted or twisted in such a way that they are shifted relative to the plane of the sheet or the plane of the sheet metal plate; in particular, they are tilted relative to the latter or are twisted out of it. Preferably, as that is done, provision is made at least before the forming so that the sheet or the sheet metal plate spans a plane which is essentially perpendicular to the reference axis of the completed component or completed guide wheel 2. In order to displace the individual blades 3 relative to or out of the plane, so-called free-form areas are provided in the area of the transition between the sub-areas of the sheet metal plate forming the later inner ring 9 or outer ring 10 and the areas forming the blades, which later describe the connecting area 12.1 to 12.2. In this free-form area, the displacement is accomplished through appropriate forming. According to the invention, beads 11 are provided in this free-form area, or at least in this free-form area in the area of blade base 7 and in the area of blade tip 8, or at least in just one of the two. These can either be incorporated in a subsequent procedural step, or according one embodiment, prior to the forming; i.e., either in a procedural step 15 that follows step 14 before the actual separating process 16, or in a step 15 that follows the separating process 16 but precedes the forming process 17, as shown clearly by the dashed line. That is, the beads 11 are already incorporated into the sheet metal plate intended for the fabrication of the basic contour, into the basic contour which is actually the basis for the forming process. This procedural step 15 offers the advantage that on the one hand the fabrication of the impeller 1 is essentially not impaired and that there are also no negative effects here with regard to the forming process, and furthermore there is no deformation due to the incorporation of the beads 11, but rather the latter are present in the state after the forming. The incorporation of the beads 11 thereby becomes essentially a question of either a process before the actual separating process or an incorporation into the plate after the separating process. In both cases the bead is already present before the necessary forming of the plate, and these are twisted around the axis of the blade in the free-form areas. The bead 11 also twists at the same time and stiffens the free-form areas in the forming direction only slightly, which is the reason why no effects on the manufacturing process are observable. After the requisite forming process, however, the bead 11 stiffens the free-form areas in the axial and circumferential directions of guide wheel 2. The individual procedural steps apply to the forms of the beads 11.1, 11.2. As already explained, bead 11 is either incorporated simultaneously already during the separating process or is present after the latter is completed.

Figure 5:
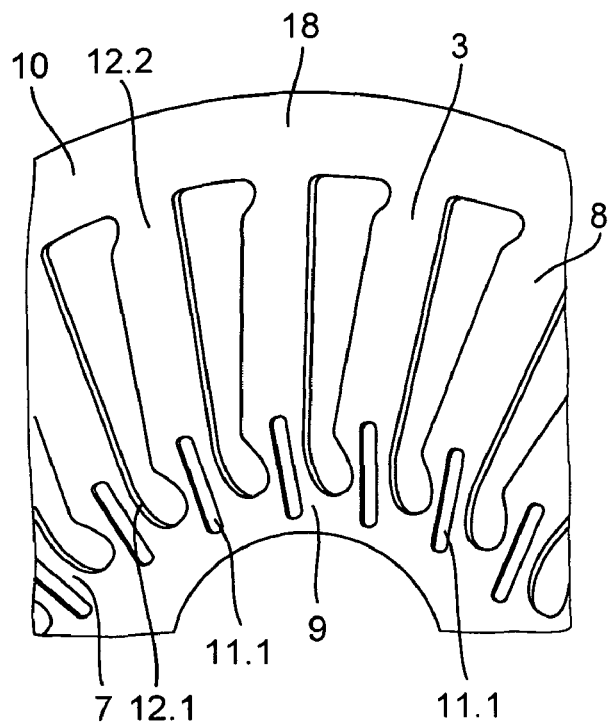
FIG. 5 is a detail showing an adapted sheet metal plate, according to the invention, with beads incorporated in the area of the blade base, after the separating process and before the forming.

FIG. 5 illustrates on the basis of a detail a semi-finished product 18 in the form of a sheet metal plate segment in its basic state, as it exists prior to the forming process 17. The beads 11.1 in the blade base 7 are visible here, as well as the one-piece execution between the later component 9 forming the inner ring and the outer ring 10 and the blade 3, and the coupling of these through the connecting areas 12.1 and 12.2. Beads 11.1, 11.2 extend here essentially in the radial direction, or in the blade direction in the radial direction, at least in the respective connecting area, shown here for the foot area, by way of example also slightly beyond them out into the area of the inner or outer ring and of the blades.

The solution according to the invention is not limited to the design depicted in the figures. It is also not limited to the design as a guide wheel 2. It can also be employed for stators or turbine wheels.

Figure 6:
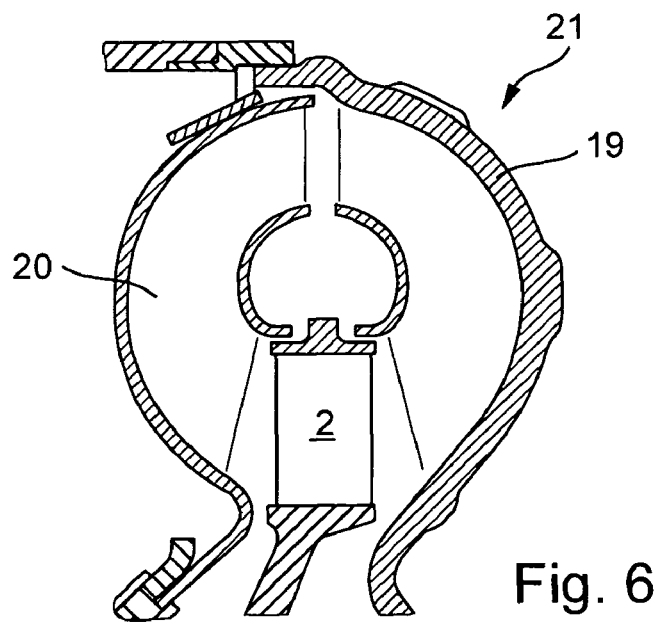
FIG. 6 is a partial cross-sectional view of a hydrodynamic speed variator/torque converter with an impeller according to the invention.

The impeller 1 designed according to the invention is used, for example, as a guide wheel 2 in a hydrodynamic speed variator/torque converter 21, as depicted in FIG. 6 on the basis of a detail from an axial section. In addition to the guide wheel 2, the latter also includes a primary wheel functioning as a pump wheel 19 and a secondary wheel functioning as a turbine wheel 20.

The hydrodynamic speed variator/torque converter 21 may also be made up of a plurality of guide wheels, which may also be designed substantially in a manner according to the invention.

The arrangement of the beads 11 here according to the invention is independent of the concrete form of the guide wheel. The geometry of the beads and their dimensioning, orientation and arrangement are based on the anticipated demands and the requisite stiffening effects that are to be realized.

The solution according to the invention is not limited to a concrete design of guide wheel 2. However, it is usable in an advantageous way for guide wheels in which the blades form a structural unit with the inner and/or outer ring.

Guide wheel 2 itself can be assembled from a plurality of segments in the circumferential direction and/or in the axial direction, as depicted in FIG. 2.

REFERENCE LABELS 1 impeller
2 guide wheel
3 blade
3.1 front side
3.2 back side
4 intermediate space
5 component
6 component
7 blade base
8 blade tip
9 inner ring
10 outer ring
11 bead
11.1, 11.2 bead
12.1, 12.2 connecting area
13 effective blade surface
14 procedural step
15 procedural step
16 procedural step
17 procedural step
18 sheet-metal plate
19 pump wheel
20 turbine wheel
21 speed variator/torque converter
$b_{11}$ width of the bead
b width of the blade
d thickness of the blade
$l_3$ length of the blade, extension in the radial direction
$d_7$ diameter of blade base
$d_8$ diameter of blade tip
$d_I$ inside diameter
$d_A$ outside diameter
M reference axis
R axis of rotation

What is claimed is:
1. An impeller, comprising:
a radially outer ring-shaped portion;
a radially inner ring-shaped portion; and,
a plurality of blades disposed between the radially outer and inner portions, each of the blades having:
a respective blade base directly connected to the radially inner portion;
a respective blade tip directly connected to the radially outer portion; and,
a respective surface connecting the respective blade base and blade tip, wherein:
stiffening means are provided in at least one of the blades in the area of the blade base or blade tip; and,
the stiffening means includes a bead formed from material forming said at least one of the blades.

2. The impeller according to claim 1, wherein an individual blade is executed in a single piece with the radially inner ring-shaped portion or the radially outer ring-shaped portion, wherein the blade base or the blade tip is at least partially formed by a connecting area between the blade and the respective ring-shaped portion, and wherein the means of stiffening is situated in a connecting area between the individual blade and the respective ring-shaped portion.

3. The impeller according to claim 1, wherein the at least one bead is situated only in the connecting area.

4. The impeller according to claim 1, wherein the at least one bead extends into the blade area.

5. The impeller according to claim 1, wherein the at least one bead extends into the radially inner ring-shaped portion or radially outer ring-shaped portion.

6. The impeller according to claim 1, wherein the bead includes a length ($l_{11}$) which extends essentially in the direction of extension of the blade surfaces in the end state, as well as a width ($b_{11}$) in the width direction of the individual blade, and a depth that is ascertainable from the height of the elevation on the front side of the blade.

7. The impeller according to claim 1, wherein a geometric form or dimensioning of the bead is determined as a function of the axial forces operable on the blade and circumferential forces operable on the blade.

8. The impeller according to claim 1, further comprising a guide wheel of a hydrodynamic speed variator/torque converter.

9. The impeller according to claim 1, usable as a stator of a hydrodynamic brake.

10. The impeller according to claim 1, further comprising a plurality of components manufactured separately from each other and each having a plurality of blades from the at least one plurality of blades, which components are firmly connected to each other, these components being situated relative to each other in such a way that blades of various ones of these components are situated in each instance at an offset to each other in the circumferential direction extending around a central axis of the guide wheel, forming intermediate spaces that exist in this circumferential direction, and each of the blades being made in a single piece between its particular entry edge and its particular exit edge.

11. The impeller according to claim 1, further comprising, in a circumferential direction, a plurality of blade ring segments.

12. The impeller according to claim 1, wherein the stiffening means is assigned to each of the individual blades.

13. A method for producing an impeller, comprising the following steps:
   preparing at least one sheet or sheet metal plate;
   working on the sheet or sheet metal plate by separation to make a semi-finished product;
   working on the semi-finished product or sheet-metal plate spanning a plane by forming a component of the guide wheel having a radially outward ring-shaped portion, a radially inward ring-shaped portion, and at least one blade with a first end directly connected to the radially outward portion, a second end directly connected to the radially inward portion, and a surface connecting the first and second ends, the at least one blade being shifted or bent in the course of the forming in such a way that the at least one blade is shifted relative to the plane of the sheet or sheet metal plate; and,
   incorporating at least one bead into the sheet before the forming by forming an indentation in the sheet or sheet metal plate, the indentation including a first closed indentation end wholly formed by the surface and a second closed indentation end, opposite the first closed indentation end, wholly formed by the first end or the second end.

14. The method according to claim 13, wherein the beads are incorporated into the sheet or sheet-metal plate before the separation.

15. The method according to claim 13, wherein the beads are incorporated into the sheet or sheet-metal plate after the separation.

16. The method according to claim 13, wherein an individual blade is executed in a single piece with the radially inner ring-shaped portion or the radially outer ring-shaped portion, wherein a blade base or a blade tip is at least partially formed by a connecting area between the blade and the respective ring-shaped portion, wherein the means of stiffening is situated in a connecting area between the individual blade and the respective ring-shaped portion, and wherein the individual segments are separably joined to each other.

17. The method according to claim 13, wherein an individual blade is executed in a single piece with the radially inner ring-shaped portion or the radially outer ring-shaped portion, wherein a blade base or a blade tip is at least partially formed by a connecting area between the blade and the respective ring-shaped portion, wherein the means of stiffening is situated in a connecting area between the individual blade and the respective ring-shaped portion, and wherein the individual segments are inseparably joined to each other.

18. The method according to claim 13, wherein the impeller is subdivided in the circumferential direction into a plurality of segments, which are separably joined to each other.

19. The method according to claim 13, wherein the impeller further comprising a guide wheel of a hydrodynamic speed variator/torque converter or is usable as a stator of a hydrodynamic brake.

20. An impeller, comprising a plurality of blades, each of the blades having a blade base and a blade tip, wherein:
   stiffening means are provided in at least one of the blades in the area of the blade base or blade tip;
   the stiffening means includes at least one bead; and,
   a geometric form or dimensioning of the bead is determined as a function of the axial forces operable on the blade and circumferential forces operable on the blade.

* * * * *